(No Model.)
L. WHEELOCK.
VELOCIPEDE.
No. 390,733. Patented Oct. 9, 1888.
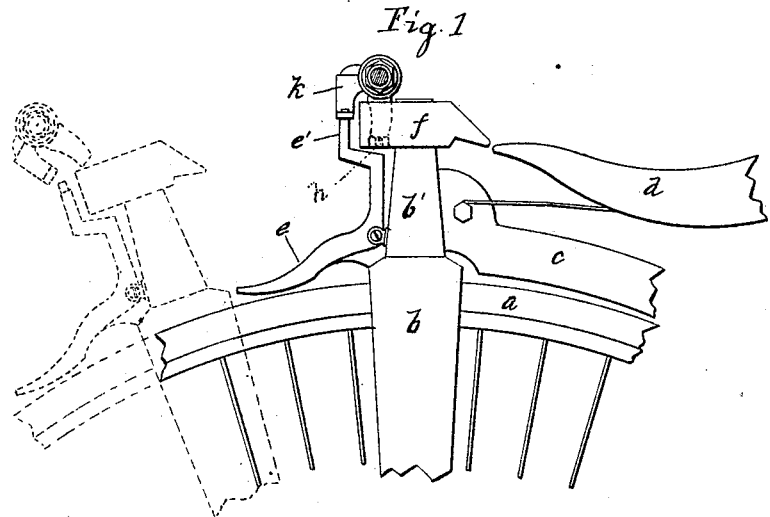
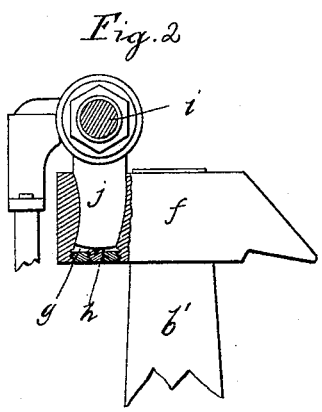
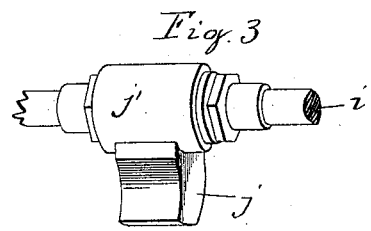
Witnesses:
James Terry
Edwin Purrington
Inventor,
Luke Wheelock.
by George Terry
Atty

UNITED STATES PATENT OFFICE.

LUKE WHEELOCK, OF NEW HAVEN, CONNECTICUT.

VELOCIPEDE.

SPECIFICATION forming part of Letters Patent No. 390,733, dated October 9, 1888.

Application filed June 26, 1888. Serial No. 278,220. (No model.)

*To all whom it may concern:*

Be it known that I, LUKE WHEELOCK, a citizen of the United States, residing at New Haven, in the county of New Haven, State of Connecticut, have invented certain new and useful Improvements in Steering-Bars for Bicycles, of which the following is a specification, reference being had therein to the accompanying drawings.

This invention relates to a handle bar or steering-bar for bicycles and such like vehicles, which escapes from its socket when the vehicle violently meets an obstruction and a "header" is imminent, and thus admits of the rider landing on his feet, instead of being caught by the handle-bar and thrown upon his head or shoulders, which latter usually happens when the handle-bar is stationary.

The invention consists in a handle-bar for the class of vehicles mentioned, made with a depending tongue, which is fitted in a socket in a head on some part of the frame—such as a vertical fork—and which securely retains its place while riding in safety, but automatically leaves such socket when an obstruction is met with and a header is imminent, the construction and operation being substantially as I will proceed now to set forth particularly and finally claim.

In the accompanying drawings, illustrating my invention, in the several figures of which like parts are similarly designated, Figure 1 is a side elevation of part of a vertical-fork bicycle, the handle-bar being in cross-section, the full lines showing the parts in position of safety and the dotted lines showing the parts in position of accident. Fig. 2 is a sectional elevation, on a larger scale, of the handle-bar and its socket, and Fig. 3 is a perspective view of the tongue and a part of the handle-bar.

The wheel $a$, fork $b$, backbone $c$, saddle $d$, and brake shoe $e$ may be of ordinary construction. The tang $b'$ of the fork, in the example shown, is provided with a head, $f$, in the end of which a socket, $g$, is made, the lower end of which may be, and preferably is, closed by a set-screw, $h$.

The handle-bar $i$, otherwise of usual construction, is made with a depending tongue, $j$, adapted to be loosely fitted in the socket $g$, and this tongue is, by preference, made as a concavo-convex wedge, angular in cross-section, and adapted to fit a correspondingly-shaped socket, the concavity of the tongue facing the front of the machine, so as the more readily to slip out of the socket in case of accidentally overturning of the vehicle.

The tongue $j$ may be made integral with a collar or head, $j'$, which serves as a foundation for the handle-bar, though I do not limit my invention to this detail of construction. The tongue $j$, when in the socket and the vehicle going in safety, is not liable to jump out of its socket or to be disengaged therefrom by ordinary use, for it will be observed that the concavo-convex shape of the tongue and its socket presents a lock to prevent displacement in a vertical right-line direction, and also in a direction rearwardly toward the rider. When, however, the vehicle is overturning, the thrust against the handle-bar is upward and forward in the line of curvature of the tongue, and hence the tongue is readily disengaged, as indicated by the dotted lines, Fig. 1.

The set-screw $h$ is adjustable to limit the descent of the tongue in its socket, and thus prevent it from binding therein so firmly as to preclude its freely slipping out of the socket in times of necessity.

The brake-shoe $e$ has an elbow, $e'$, which is loosely fitted in a hole in the brake-lever $k$, so as to become disconnected therefrom in case of accident. Any other suitable disjointing-connection may be made between the brake shoe and brake-lever. As clearly indicated by the dotted lines in Fig. 1, when the fork is tilted forward, the weight and disturbance of the balance of the rider will assist in pulling the handle-bar free from its socket and brake-shoe connection, and thus the rider may break his fall with his legs free from entanglement with the handle-bar, and be enabled to land on his feet instead of suffering the proverbial header.

It is equally clear that should the vehicle suffer no damage by such an accident the handle-bar may be readily replaced intact.

Of course I am aware that the principle of the invention is not new in so far as a detachable handle-bar for this purpose, broadly considered, is concerned; hence

What I claim is—

1. A handle-bar provided with a depending tongue, combined with a head having a socket in which said tongue is loosely fitted and from which it becomes automatically detached in case of accident, and a set-screw in said socket to limit the extent of entrance of the tongue into said socket, and thus prevent it from binding therein so firmly as not readily to slip out, substantially as described.

2. A handle-bar provided with the concavo-convex tongue, combined with the head constructed with a complemental socket, substantially as and for the purpose set forth.

In testimony whereof I affix my signature in presence of two witnesses.

LUKE WHEELOCK.

Witnesses:
GEORGE TERRY,
JAMES TERRY.